May 26, 1959 S. B. WILLIAMS 2,888,242
TURBINE BLADE
Original Filed Nov. 9, 1950 3 Sheets-Sheet 1
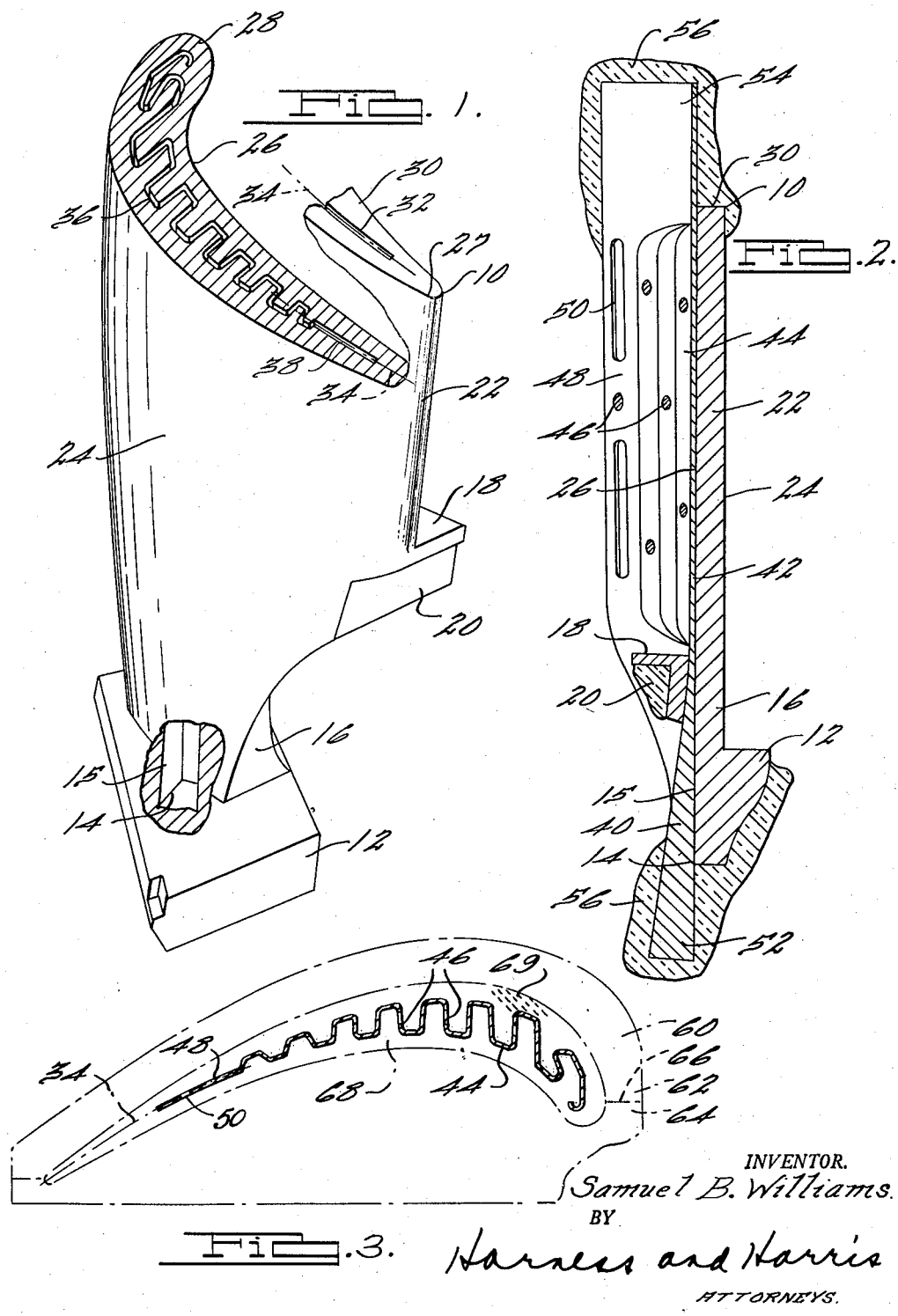
INVENTOR.
Samuel B. Williams.
BY
Harness and Harris
ATTORNEYS.

May 26, 1959        S. B. WILLIAMS        2,888,242
TURBINE BLADE
Original Filed Nov. 9, 1950        3 Sheets-Sheet 2

INVENTOR.
Samuel B. Williams
BY
Harness and Harris
ATTORNEYS.

May 26, 1959     S. B. WILLIAMS     2,888,242
TURBINE BLADE
Original Filed Nov. 9, 1950     3 Sheets-Sheet 3
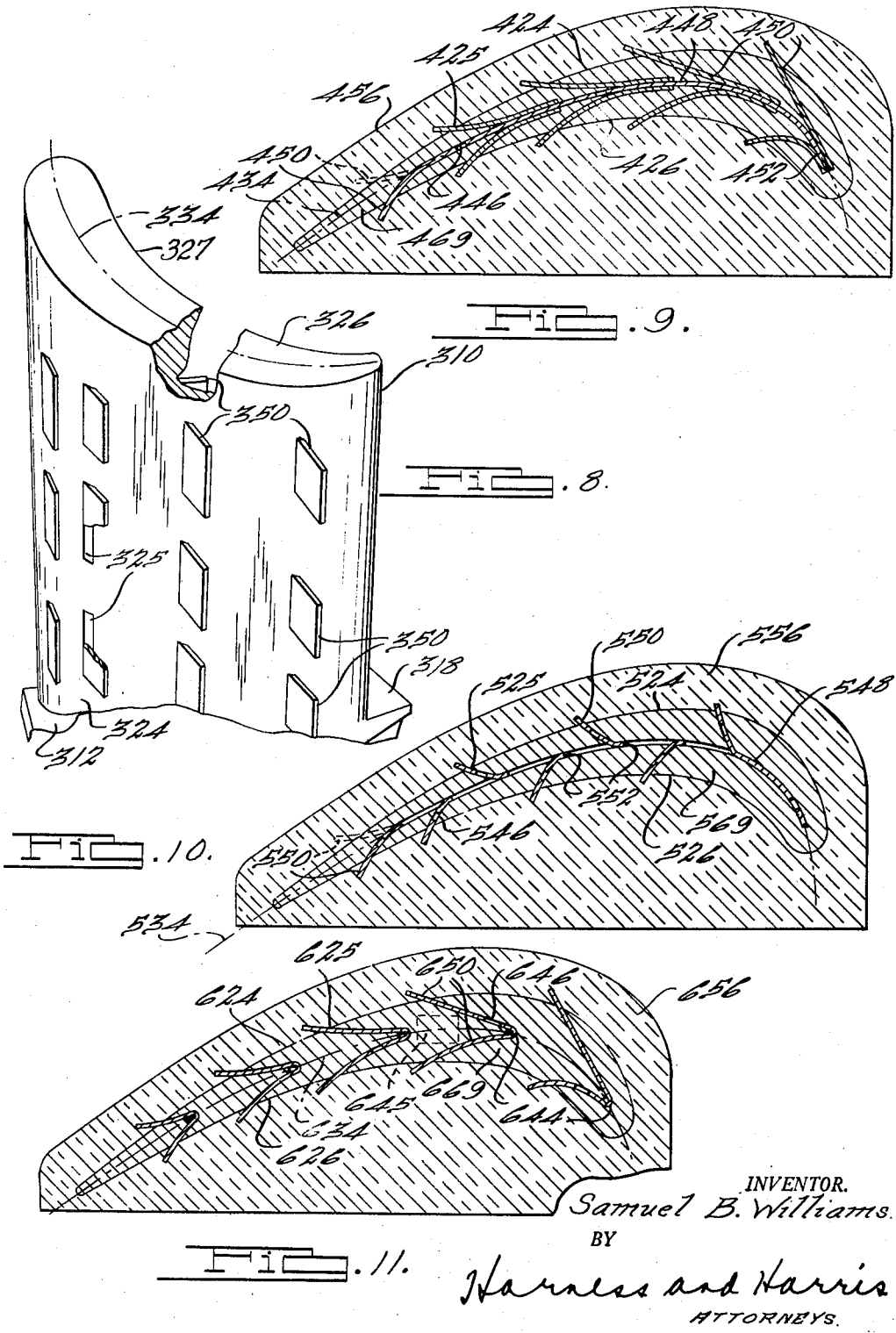
INVENTOR.
Samuel B. Williams
BY
Harness and Harris
ATTORNEYS.

United States Patent Office 2,888,242
Patented May 26, 1959

2,888,242

TURBINE BLADE

Samuel B. Williams, Birmingham, Mich., assignor to Chrysler Corporation, Highland Park, Mich., a corporation of Delaware Original application November 9, 1950, Serial No. 194,849. Divided and this application December 15, 1953, Serial No. 398,371

3 Claims. (Cl. 253—39.15)

This application relates to turbine blades and in particular to air cooled turbine blades which are suitable for use in gas turbine engines.

Turbine blades have commonly been formed with hollow interiors for the purpose of providing a cooling air passage. The blade itself is formed of sheet metal and is fabricated in any suitable manner to define the desired blade contour with a large central chamber. Such a blade design is objectionable for many gas turbine installations because of the poor heat transfer characteristics obtained in the air passage and because the interior cavity reduces the structural rigidity of the blade itself.

The present invention represents a distinct improvement over the air cooled blades of the prior art in that the blade is provided with a cooling air passage which extends axially through the blade from the root to the tip and which comprises a narrow slot extending from the leading edge to the trailing edge of the blade.

According to certain embodiments of the invention, the cooling air passage may define in cross section a convoluted pathway within the body of the blade. According to other embodiments of the invention, a main air passage may be disposed substantially along the mean camber line of the blade and a plurality of branch passages may extend from the main air passage to the blade surfaces.

All of the presently disclosed embodiments are designed to produce a relatively high heat transfer coefficient in the air passage. This is accomplished by substantially reducing the effect of the insulating boundary layer or film inside the cooling passages. Consequently, the temperature rise in the cooling air will correspondingly increase during flow of the cooling air through the blade by virtue of the resulting reduction in the value of the film coefficient. This increased efficiency makes it possible to reduce the air flow rate which in turn results in a significant increase in the overall efficiency of the gas turbine engine.

Accordingly, an object of the present invention is to provide an air cooled turbine blade in which the cooling air passage thereof defines a tortuous pathway extending axially through the blade.

Another object of the present invention is to provide a turbine blade as set forth in the preceding objects wherein the cooling air passage traverses the blade from the leading edge to the trailing edge.

Another object of the present invention is to provide a turbine blade according to the preceding objects wherein reinforcing ribs are provided within the axial passages to further increase the structural rigidity of the blade.

According to a feature of a modified embodiment of the present invention, a turbine blade is provided in which an air cooling passage is formed axially therethrough and wherein openings are provided in the blade surface communicating with the axial air passage.

According to a feature of a further modified form of the invention a turbine blade is provided in which several individual air cooling passages are formed axially therethrough, each of said passages communicating laterally with an opening in the turbine blade surface.

Further features, objects and advantages will become apparent from the following description and the accompanying drawings wherein:

Figure 1 is a perspective view partially in section of a turbine blade of one form of the present invention;

Figure 2 is a longitudinal section of a portion of the blade and an insert used during the forming process to provide an air passage;

Figure 7:
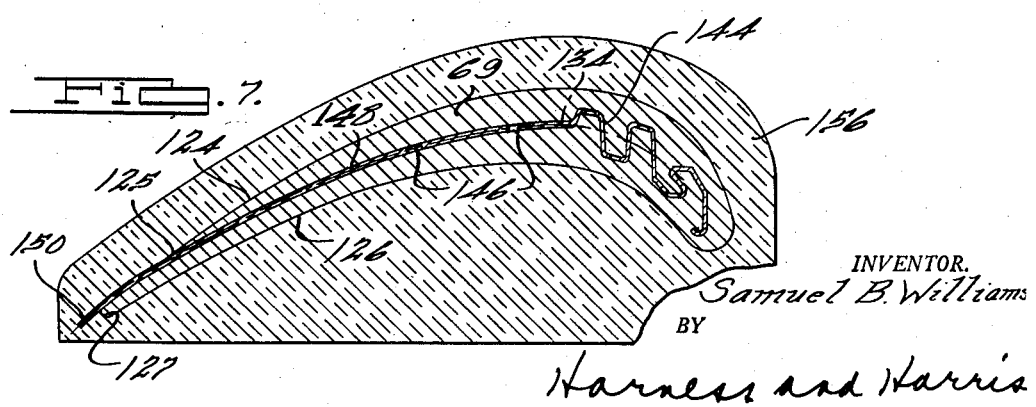

Figures 3, 4, 5, and 6 are sectional views showing the various steps of the manufacturing process;

Figure 7 shows a modified form of blade and insert;

Figure 8 shows a modified form of blade together with an insert adapted to provide openings in the blade surface to accommodate the flow of cooling air; and Figures 9, 10, and 11 are sectional views showing the various steps of the manufacturing process for forming the blade of Figure 8.

The application is a division of application Serial No. 194,849, filed November 9, 1950, now abandoned.

Having reference first to Figures 1 and 2 of the drawings a turbine blade, generally indicated at 10, has a root portion 12 in the base of which is formed a port 14. Leading internally of the blade from port 14 is an internal passage 15 which passes through the throat 16 of the blade. A ledge 18 is formed on the blade and supported by one or more web-like members 20.

The body portion 22 of the turbine blade may be provided with a convex face portion 24 and a concave portion 26. The convex and concave faces merge at trailing edge 27 of the blade and at a relatively thicker leading edge 28. A blade tip edge, shown at 30, is formed with a thin slot or passage 32 of generally uniform width conforming generally to the mean camber line 34 for the tip of the blade. For purposes of illustration, the blade 10 is broken away to disclose a section so as to show slot 32 extending axially and longitudinally of the blade and having a portion 38 disposed along the mean camber line 34 for the blade and an additional convoluted portion 36 in communication with portion 38. The convoluted portion 36 of the passage comprises a number of transverse portions extending across the mean camber line and joined by lateral portions extending approximately midway between the mean camber line and the adjacent side of the blade, the thickness of the blade material along the mean camber line between the successive transverse portions being greater than twice the thickness of the passage portion 36.

The internal passages for the blade may be provided during the manufacturing process by an insert having a lower thickened portion 40 received in the internal blade passage 15. A generally longitudinal portion 42 of the insert is formed with a plurality of convolutions or corrugations 44 giving rise to the convoluted passage in the turbine blade proper.

Formed in the convoluted portions of the insert is a plurality of openings 46 providing for the unification of the turbine blade walls therethrough. A longitudinal portion 48 of the blade insert is arranged to conform generally to the intermediate camber line of the individual blade section and is provided with one or more openings 50 which may be elongated to provide for unification of the actual blade portions on either side of the insert. The extremity 52 of lower portion 40 of the insert and the extremity 54 of the insert are received along with the blade 10 in a ceramic investment mold generally indicated at 56. The mold 56 may be broken away or otherwise removed after which the insert for the blade may be removed. The insert may be formed of nickel, aluminum, cadmium, or copper, or some suitable material which may be readily etched out of the blade.

For the purpose of more completely describing the manufacturing process, reference will be made to Figures 3, 4, 5, and 6. Figure 3 shows a section through the blade insert. The convoluted portion 44 of the insert may be provided with a number of openings 46, through which the blade material may pass, and has attached thereto a longitudinal portion 48 generally conforming to the mean camber line of the blade. The insert is adapted to be received in a die 60 formed on upper and lower mating halves 62 and 64 which are separable along a parting line 66. A die defines a space 68 conforming generally to the external contour of the blade which latter will be ultimately formed of Stellite or Stellite-like material.

Figure 4:
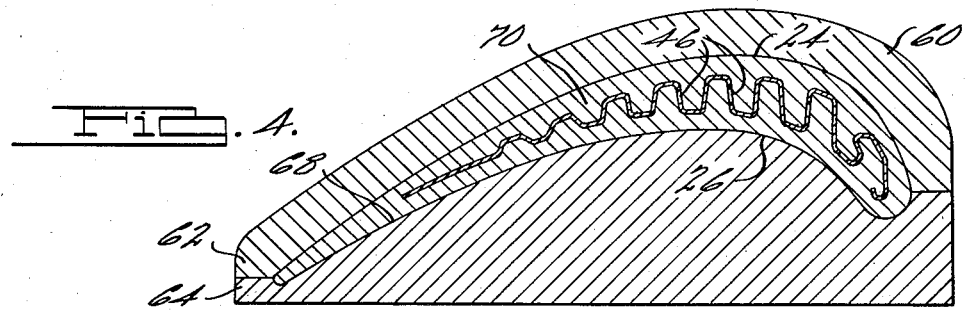

In Figure 4 the die 60 is shown after a material 70 has been poured into the cavity 68. Material 70 is a filling material of the type used in precision investment casting and may consist of a low melting alloy of aluminum, cadmium or lead. If wax is selected as the material 70, the process of filling cavity 68 in and around the insert is sometimes known as the lost wax process.

Figure 5:
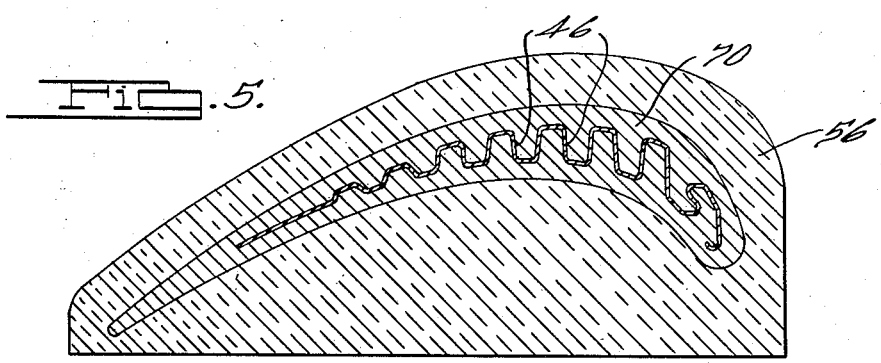

After material 70 has taken a final shape, the die is replaced by a frangible investment mold 56 of ceramic or plaster, or the like. This step of the process is shown in Figure 5. The filling material 70 is then removed from the ceramic investment mold to leave the insert suspended in the cavity therein.

Figure 6:
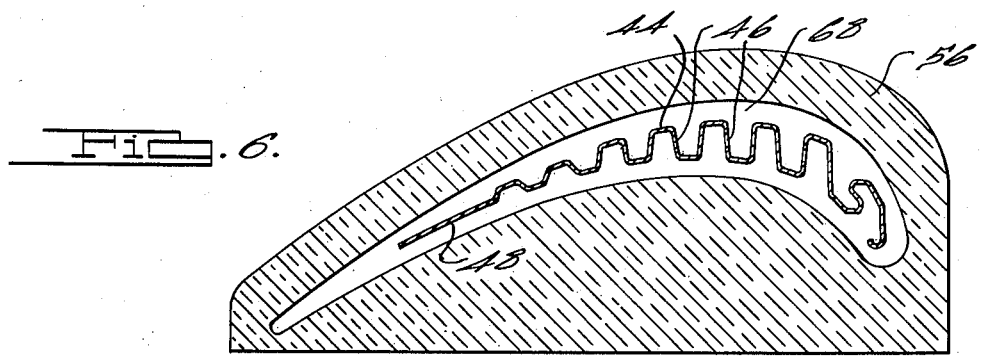

In Figure 6, the insert is shown suspended within the ceramic investment mold 56 preparatory to the filling of the cavity thereof with Stellite or Stellite-like material, which is the final blade composition. The final product is the blade 10 shown in Figure 2 which may be transformed into the blade of Figure 1 merely by removing the ceramic investment mold 56 and removing the insert either by etching, leaching, or melting as appropriate. The material for the insert may be any etching susceptive metal such as nickel.

In the modification of Figure 7, an insert is shown having a convoluted or corrugated portion 144 surrounded by Stellite or other suitable material 69. A longitudinal portion 148 of the insert is attached to convoluted portion 144 and conforms generally to the intermediate camber line 134. Longitudinal portion 148 constitutes a fin structure which has a portion 150 projected through the convex face 124 of the blade adjacent the trailing edge 127 thereof. At the point of emergence of fin portion 150 a slit 125 is formed in the skin of the blade so that when the insert is removed from the blade, an air passage will result thus permitting cooling air to discharge from within to without the blade along the trailing edge. A plurality of openings 146 may be provided in the insert in order that the parts of the Stellite blade may unify properly.

In Figure 8 a modified blade 310 is shown, the tip edge 326 of which may be entirely closed off. The mean camber line for the tip 326 is indicated at 334. Between the root 312 of the blade 310 and the tip 326 a plurality of fins 350 is shown projecting from the face of the blade 324 and arranged in rows and columns to define air exit slits 325. The fins 350 as shown, may be on both sides 324 and 327 of the blade.

Referring to Figure 9, an insert is shown which is useful in constructing the blade of Figure 8. The longitudinal portion 448 of the insert conforms generally to the mean camber line 434 of the blade proper. The blade material 469, which may be of Stellite, generally surrounds the longitudinal portion 448 of the insert and is united with other parts of the blade through suitable openings 446 provided in the insert. A plurality of fins 450 is provided on the longitudinal portion 448 of the insert and suitably connected thereto as by bonding or welding at 452. The diverging fins 450 emerge from the respective convex and concave faces 424 and 426 of the blade to define slits as indicated at 425. The fins are firmly held in the ceramic investment mold for proper positioning.

In Figure 10 a modified form of finned insert is shown. The longitudinal portion 548 of the insert conforms generally to the intermediate camber line 534 of the blade metal 569. A plurality of openings 552 result from lancing fins 550 from the longitudinal portion 548, which fins 550 project through the respective concave and convex faces 526 and 524 of the turbine blade. Fins 550 are formed with openings 546 similar to the openings 46 and project through the blade faces to produce slits 525, which are similar to the slits 325 of Fig. 8.

In Figure 11, the ceramic investment mold 656 receives a plurality of insert members 644 generally gathered together in the root of the blade, indicated at 645 and similar to the root 12 of Fig. 1. Each of the members 644 extends substantially throughout the length of the turbine blade proper. Each member 644 is formed with a plurality of fins 650 which project through the faces 624 and 626 of the turbine blade. The fins 650 are suitably held in a ceramic mold 656 and define in the face of the blade a plurality of slits 625. It is to be noted that the members 644 of the longitudinal inserts are generally disposed along the mean camber line 634 between the opposed faces 624 and 626 of the blade.

As may be readily observed, both the convoluted portions and the finned portions of these blades above described contribute to provide a certain rigidity necessary in the casting process for the Stellite. This same structural rigidity is of advantage in handling the inserts during their application to the molds.

In addition to the higher heat transfer coefficient which may be obtained by using a slotted air passage of the type herein disclosed, the tortuous configuration of the air passage substantially reduces the possibility of the formation of localized heat concentrations. Also, the plurality of branch air passages extending to the surface of the blades provide the same protection against the formation of heat concentration on the surface of the blade.

Variations within the spirit and scope of the invention described are equally comprehended by the foregoing description.

I claim:

1. A cambered air cooled turbine blade having a root portion, a tip portion, a leading edge, a trailing edge, and air passage means formed therein for conducting air from said root portion to said tip portion, said passage means being of approximately uniform thickness and having a first portion extending along the mean camber line of said blade from adjacent said trailing edge, said passage means also having a convoluted portion extending from said first portion to adjacent said leading edge, said convoluted portion comprising a number of transverse portions extending across said mean camber line and joined by lateral portions extending approximately midway between the adjacent side of the blade and said mean camber line, the thickness of the blade material along said mean camber line between successive transverse portions of said passage means being greater than twice the thickness of said passage means.

2. A cambered air cooled turbine blade having a root portion, a tip portion, a leading edge, a trailing edge, and air passage means formed therein for conducting air from said root portion to said tip portion, said passage means being of approximately uniform thickness and having a first portion extending along the mean camber line of said blade from adjacent said trailing edge, said passage means also having a convoluted portion extending from said first portion to adjacent said leading edge, said convoluted portion having convolutions extending laterally from said mean camber line approximately half the remaining distance to the opposite exterior sides of said blade, the thickness of said slot being relatively slight in comparison with both the thickness of said blade and the spacing between successive convolutions, said convolutions including portions extending transversely of said mean camber line, and said blade having portions at spaced locations extending through the transverse portions and joining the juxtaposed portions of said blade at opposite sides of said transverse portions.

3. A cambered air cooled turbine blade having a root portion, a tip portion, a leading edge, a trailing edge, and air passage means formed therein for conducting air from said root portion to said tip portion, said passage means being approximately of uniform thickness and having a first portion extending along the mean camber line of said blade from adjacent said trailing edge, said passage means also having a convoluted portion extending from said first portion to adjacent said leading edge, said convoluted portion having convolutions extending laterally from said mean camber line approximately half the remaining distance to the opposite exterior sides of said blade, the thickness of said passage means being relatively slight in comparison with both the thickness of said blade and the thickness measured along said mean camber line of the blade material spacing successive convolutions, said first portion opening at the exterior of said blade adjacent said trailing edge.

References Cited in the file of this patent

UNITED STATES PATENTS

| | | |
|---|---|---|
| 2,149,510 | Darrieus | Mar. 7, 1939 |
| 2,613,910 | Stalker | Oct. 14, 1952 |
| 2,644,665 | Cangemi | July 7, 1953 |
| 2,647,368 | Triebbnigg | Aug. 4, 1953 |

FOREIGN PATENTS

| | | |
|---|---|---|
| 319,622 | Great Britain | Dec. 18, 1930 |
| 594,931 | Germany | Mar. 23, 1934 |
| 829,969 | Germany | Jan. 31, 1952 |
| 1,007,303 | France | Feb. 6, 1952 |